3,094,549
PROCESS FOR PREPARING HYDROXYALKYL
PHOSPHATES
Arthur E. Gurgiolo and Robert A. Newton, Lake Jackson, Tex., assignors to The Dow Chemical Company, Midland, Mich., a corporation of Delaware
No Drawing. Filed July 27, 1961, Ser. No. 127,139
12 Claims. (Cl. 260—461)

This invention relates to an improved process for producing phosphate esters of alkylene glycols and dialkylene glycols and to the esters thus obtainable.

It is known to condense alkylene oxides with phosphoric acid, thus to form phosphate esters wherein the phosphoric acid is esterified more or less completely with an alkylene glycol or a polyoxyalkylene glycol (see, for instance U.S. Patent 2,372,244). Another known method of making such esters is by the reaction of a phosphorus halide with the glycol or polyoxyalkylene glycol (see British Patent 653,353). In these prior methods it has been found quite difficult to esterify all three of the hydroxyl groups of phosphoric acid, the second and third such groups being well known to be progressively less reactive than the first. In the method of the above U.S. patent, for instance, it has been found that 6 to 7 moles of alkylene oxide must be used per mole of phosphoric acid in order to produce a product having a satisfactorily low acid number. A similar difficulty is encountered in the process of the above British patent in that it is difficult to react all the halogen in the phosphorus halide. Also, polymerization and halogenation of the initial product are unavoidable.

It is an object of the present invention to provide improved methods for condensing phosphoric acid with alkylene oxides whereby tri-esters are formed with minimum consumption of alkylene oxide; i.e., not more than about 5 moles per mole of phosphoric acid, and having a low acid number, preferably below 5.

According to the invention, phosphoric acid is condensed with an alkylene oxide in an inert organic solvent. The use of a solvent greatly facilitates the reaction and results in the production of a product having the above desired characteristics.

Any solvent that dissolves the reactants and is inert to them under the conditions of the process can be used. Preferably it should be sufficiently volatile to be readily distillable. Suitable solvents include ethers, such as diethyl and dibutyl ethers and dioxane; alkyl nitriles, such as acetonitrile and butyronitrile; the polyhalogenated aliphatic hydrocarbons, such as chloroform, methylchloroform and trichloroethylene; alkyl phosphates and phosphonates, such as triethyl phosphate, dimethyl butylphosphonate, tributyl phosphate and diethyl phenylphosphonate; dialkyl sulfoxides, such as dimethyl or diethyl sulfoxide, mixtures of the foregoing solvents, and the like. Of these, the preferred solvents are dioxane, acetonitrile, triethyl phosphate and chloroform.

The amount of solvent may be varied widely, as little as one volume per volume of phosphoric acid being beneficial. Larger amounts up to fifty volumes or more give improved results and even larger amounts may give some further improvement. Practical considerations of reactor capacity and recovery costs usually limit the amount of solvent to not more than about fifty volumes, the preferred amount being usually about 5 to 30 volumes per volume of phosphoric acid.

In the reaction of phosphoric acid with an alkylene oxide, the initial rate of reaction is high, the rate decreasing rapidly after about two molar equivalents of the oxide have been reacted. For this reason it may be advantageous to raise the reaction temperature and/or the concentration of alkylene oxide after the initial stage of the reaction is completed. The reaction is conveniently started at a relatively low temperature, such as 50–80° C., and the temperature thereafter gradually raised as the reaction proceeds until a maximum of 120–150° is reached. Similarly, the alkylene oxide is conveniently added progressively during the reaction, the final concentration being suitably about 1 to 10 moles of oxide per mole of phosphoric acid used. The excess, if any, after the low acid number shows that the reaction is complete, is readily removable by distillation.

The alkylene oxides useful in the process of the invention include not only the alkylene oxides, such as ethylene oxide, propylene oxide and the isomeric butylene oxides but such oxides containing inert substituents, such as epichlorohydrin, styrene oxide, glycidol and the ethers and esters of glycidol.

In general, the process of the invention consists essentially of dissolving the phosphoric acid and at least a part of the alkylene oxide in a suitable volume of the solvent, heating the mixture at reaction temperature, with or without concurrent addition of more oxide, until the acid number of the mixture has fallen to a suitable low value, thus indicating that all the hydrogens of the phosphoric acid have reacted with oxide, removing the excess oxide, if any, and thus obtaining the desired phosphate ester as a residue.

The practice of the invention is further illustrated by the following examples:

*Example 1*

Into a 10-gallon reactor was charged 40 lb. of dioxane and 5 lb. of 97% $H_3PO_4$. The reactor and contents were heated to 80° C., after which 35 lb. of 1,2-propylene oxide was added over a 20-minute period, the temperature being maintained at 80–100° C. The mixture was digested 4 hours at 80°, after which the excess propylene oxide and the dioxane were distilled out. The residue was an almost colorless oil containing 9.5% phosphorus and 13.9% OH and having an acid number of less than 0.1 and a hydroxyl equivalent weight of 122. From the phosphorus analysis, and assuming one atom of phosphorus per molecule, it can be calculated that only 3.9 moles of oxide reacted with each mole of phosphoric acid. Thus, the product apparently consisted of a mixture of tris(2-hydroxypropyl) phosphate and bis(2-hydroxypropyl) 2-(2-hydroxypropoxy) propyl phosphate.

*Example 2*

By use of the equipment and procedure described in Example 1, 35 lb. of ethylene oxide were added over a 25 minute period to a solution of 5 lb. of 97% phosphoric acid in 40 lb. of dioxane while the temperature of the mixture was maintained at 80–105° C.

The product thus obtained was an almost colorless oil containing 15.7% OH and 9.5% phosphorus and having an acid number of 1.0. The pH of a 25% solution in methanol-water (10:1 moles) was 3.7. These analyses correspond to a phosphate ester containing 5.1 oxyethylene groups.

*Example 3*

Into a 5-liter reactor was placed 196 g. (2.0 moles) of 100% $H_3PO_4$ and 800 g. of dioxane. The mixture was heated to 75° C. after which 1040 g. (11.25 moles) of epichlorohydrin were gradually added while the temperature was maintained at 75–80°. After the mixture had digested 30 minutes at 75° C. it was allowed to stand 18 hours at room temperature. Then the solvent and unreacted epichlorohydrin were removed by vacuum distillation, the final stage being at 90° C. and 5 mm. pressure for 72 hours. There was thus obtained 970 g. of a light yellow, viscous syrup having an acid number of 0.25. Analysis showed it contained 5.6 epichlorohydrin moieties per atom of phosphorus.

Example 4

Into a 2-liter reactor was put 98 g. (1 mole) of 100% H₃PO₄ and 392 g. of dioxane. While the temperature was maintained at 50° C., 513 g. (4.5 moles) of alkyl glycidyl ether over a 30-minute period, after which the mixture was digested 1 hour at 80° C. The solvent and unreacted glycidyl ether were then distilled at 80° C. (pot temperature) and 5 mm. pressure to leave 520 g. of an oily product having 11.6% OH and 7.05% phosphorus.

While in the above examples dioxane was used as the solvent, equally good results were obtained when acetonitrile or triethyl phosphate were used. Slightly poorer, though satisfactory, results were obtained with chloroform, diethyl ether and xylene.

Good results have been obtained with phosphoric acid varying from 85% to 102% nominal H₃PO₄.

In other experiments similar to that described above using various oxides and solvents as set forth herein about 3.5 to 5 moles of oxide were required to reduce the acid number of the product to 1.0 or less. Hydroxy equivalent weights as low as 108 were sometimes obtained in such products made with propylene oxide.

Ethylene oxide reacts more vigorously than propylene oxide and hence can be used at lower temperatures and with shorter reaction times. On the other hand, epichlorohydrin, the butylene oxides and styrene oxide are less reactive and require higher temperatures, longer times or higher concentrations of oxide to produce products having acid numbers below 5.

The new compounds of the invention are useful for the same purpose as the related materials described in the patents cited above. They are particularly useful as polyol reactants in the production of fire-resistant urethane resins, as is more fully described in the copending application of Presley and Davis, entitled "Self-Extinguishing Polyurethane Resin," filed July 25, 1961, Serial No. 126,526.

We claim:
1. In the process of producing phosphate esters by the condensation of phosphoric acid with an alkylene oxide, the improvement of conducting said condensation in an inert organic solvent.
2. The process defined in claim 1 wherein the solvent is dioxane.
3. The process defined in claim 1 wherein the solvent is an alkyl nitrile.
4. The process defined in claim 1 wherein the solvent is a polyhalogenated aliphatic hydrocarbon.
5. The process defined in claim 1 wherein the solvent is an alkyl phosphate.
6. The process defined in claim 1 wherein the solvent is a dialkyl sulfoxide.
7. The process defined in claim 1 wherein the solvent is acetonitrile.
8. The process defined in claim 1 wherein the solvent is chloroform.
9. The process defined in claim 1 wherein the solvent is triethyl phosphate.
10. The process defined in claim 1 wherein the solvent is used in an amount at least equal in volume to the phosphoric acid.
11. A mixture of hydroxyalkyl phosphate esters containing an average of about 3.5 to 5 oxyalkyl groups per molecule and having an acid number of not more than about 5.
12. The composition defined in claim 11 wherein the oxyalkyl groups are oxypropyl groups.

References Cited in the file of this patent

UNITED STATES PATENTS

| | | |
|---|---|---|
| 2,372,244 | Adams et al. | Mar. 27, 1945 |
| 2,830,069 | Smith | Apr. 8, 1958 |
| 2,842,462 | Haas et al. | July 8, 1958 |
| 2,909,559 | Lanham | Oct. 20, 1959 |